G. WESTINGHOUSE, Jr.

Pipe-Couplings.

No. 8,291. Reissued June 18, 1878.

Witnesses

C. L. Parker

John J. McCormick

Inventor George Westinghouse Jr.

By Attorney George H. Christy

UNITED STATES PATENT OFFICE.

GEORGE WESTINGHOUSE, JR., OF PITTSBURG, PENNSYLVANIA.

IMPROVEMENT IN PIPE-COUPLINGS.

Specification forming part of Letters Patent No. 157,951, dated December 22, 1874; Reissue No. 8,291, dated June 18, 1878; application filed June 6, 1878.

*To all whom it may concern:*

Be it known that I, GEORGE WESTINGHOUSE, Jr., of Pittsburg, in the county of Allegheny and State of Pennsylvania, have invented certain new and useful Improvements in Pipe-Couplings; and I do hereby declare the following to be a full, clear, concise, and exact description thereof, reference being had to the accompanying drawing, making a part of this specification, and in which—

Figure 3:
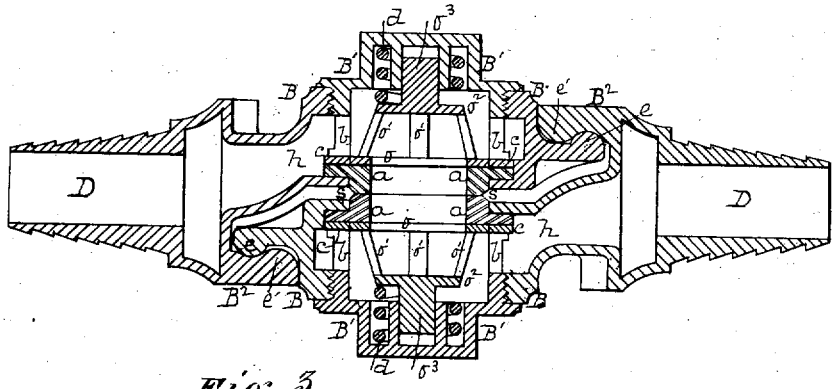
Figure 2:
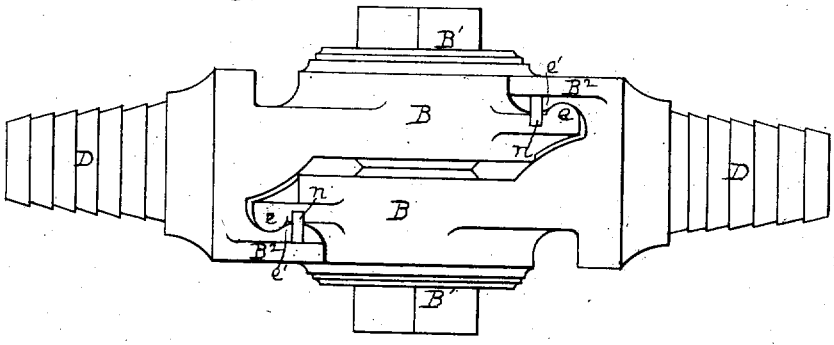
Figure 1:
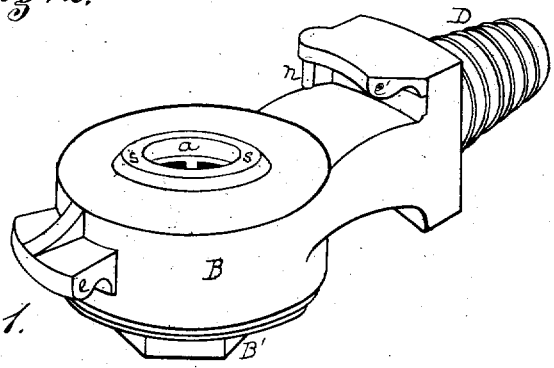

Figure 1 is an outline perspective view of one part or half of my improved coupling. Fig. 2 is a side elevation or edge view of the two parts of the coupling when united; and Fig. 3 is a longitudinal sectional elevation in a plane passing vertically through the axial line of Fig. 2.

In the several figures the same part is indicated by the same letter.

This invention, while applicable in some of its novel features to pipe-coupling purposes generally, is particularly designed and adapted for use in connection with the flexible hose of air-brake pipes, where, in order that the cars may be turned end for end, it is important that in either position of the cars the half-couplings attached to them may be capable of being united or coupled together. In this invention, each half-coupling is exactly like each other half-coupling, so that on a train of cars fitted up with the same, and with flexible hose-connections, the coupling together of the brake-pipes will not be affected by the reversal of any of the cars.

To enable others skilled in the art to make and use my invention, I will proceed to describe the same, and the construction and operation of the several parts or elements thereof.

The outer end of each half-coupling consists of a thimble or tube, D, by means of which the half-coupling is secured to the flexible hose in the manner well understood in the art. An open port or passage, *h*, leads thence to the inner ported end part B of the half-coupling, which end part, for brevity and convenience, I herein term a "box." This end part or box B is closed on one side by a cap, $B^1$, screwed therein, and on the other open or port side contains an annular india-rubber packing-ring, *a*, through the opening of which communication is effected with a like opening in the other or opposite half-coupling. The ring *a* is held in place by a washer, *c*, and posts *b*, projecting from the cap $B^1$ on one side, and by a shoulder or seat in the box on the other side, and at its outer end it projects through and a short distance beyond the port, as at *s*, and is so arranged in each half that when the two half-couplings are brought together these packing-rings will come together face to face, or end to end, as shown, and their openings, then being in line or coinciding, will afford an uninterrupted, though circuitous, through passage-way for the air.

The projecting parts *s* of the packing-rings *a*, when thus brought face to face in coupling, are compressed somewhat by the action of the hooks *e* on the extremities of the boxes B, and outside of or beyond the ports or openings, by means of which the through passage-way is secured. Each of the hooks *e* engages a bead or counter-hook, *e'*, on the under side of a flange, $B^2$, made for that purpose on the other half-coupling at the side of the port-opening opposite to its hook *e*. But the rings *a* should project far enough to be capable of still further compression in case of the forcible separation of the couplings, as hereinafter described. In order to hold these rings more effectually in contact with each other, and thereby prevent the escape of air or other leakage, I bring a pressure to bear on the back or inner face or end of each one by means of a skeleton pressure frame, *o* $o^1$ $o^2$, such as will not interfere with the flow of air, and a spring, *d*, interposed between it and the cap. This pressure-frame, as shown, consists of an annulus, *o*, which bears against the ring-posts $o^1$, a pressure-plate, $o^2$, against which the spring *d* bears, and a stem, $o^3$, to steady it in place; but the form of this frame may be changed somewhat without seriously, if at all, impairing its function.

The half-couplings thus made are duplicates of each other, and, when attached by flexible hose, any two may be coupled at pleasure. The hooks described are preferably made, one or both, with a slight bevel, so that, while retaining their hold on each other under the strain to which they are subjected in ordinary use, they may be pulled apart or become automatically disengaged when exposed to more than the usual strain; and this function is further secured by the fact that the packing-rings *a* extend a little beyond the faces of their boxes or beyond the port-openings, as shown at *s*, and, under the unusual strain referred to, the rings may then be sufficiently compressed to allow the hooks *e e'* to slip over each other, and thus become disengaged.

The coupling parts are united by a rotary motion of each on the axis of its port-opening. The half-couplings are brought together with their port-openings coinciding, but with the hooks *e e'* projecting past each other, and then, each hook being curved in the direction of its length to the proper radius, the couplings are rotated, the hooks engaging each other, till each hook *e* comes against a proper stop, *n*, (which in this case consists of a post,) suitably arranged for that purpose. In practical use it will be found that ordinarily the couplings, when united, will incline edgewise to one side or the other, and to prevent, in such case, their becoming uncoupled by the partial rotation of the two halves under their own weight, I prefer to turn or twist one or the other before coupling, so that when the two are coupled together such twist, transmitted back to the flexible hose, will cause them to hang edgewise, and with the stops *n* on the under side. Their weight will then, in connection with the stops *n*, keep them from becoming uncoupled while the train is running, except when forcibly pulled apart, as above referred to.

Other suitable form of stop may be used, and for some purposes a single one may suffice.

The construction described, it will be observed, gives, in effect, a splice-joint, by which I mean that one end part so far laps onto the other that the two may be secured face to face by a fastening which secures the extremity or toe of each, outside of or beyond the lapping ports, to what may be termed the "heel" of the other, or, in other words, to a part of the other back of its port.

Each lapping end part constitutes, in effect, an abutment against or on which the other lapping end part rests, while the two parts are secured together by a double fastening, each half of which is diagonally opposite to the other half, as regards the place of junction or union—that is to say, they are on opposite sides of the junction or lap both longitudinally and transversely of the coupling, and both fastenings are sufficiently secure or firm for ordinary purposes while the train is running, and are also automatically separable under unusual strain.

The parts of the coupling may, if so desired, be provided with valves having the function of the valves shown and described in reissued Letters Patent No. 5,504, granted to me July 29, 1873; and, where automatic detachability is not desired, other known fastening devices not involving such capacity may be employed.

I claim herein as my invention the following features or elements of improvement:

1. A two-part pipe-coupling the parts of which are automatically detachable under unusual strain, and having lateral port-openings, by which through communication is effected when the two halves which constitute the coupling are duplicates of each other, substantially as set forth.

2. In a two-part splice-joint pipe-coupling wherein the two halves are of like construction, the ported end parts lapping onto and supporting each other transversely, in combination with a double fastening capable of being automatically detached under unusual strain, each such fastening securing the toe of one lapping part to the heel of the other, substantially as set forth.

3. In a half-coupling, a port-opening adapted to give a circuitous through passage-way, in combination with the one part or half of a fastening forward of the port, (in the direction of the length of the coupling,) and also in combination with the counterpart or other half of a like fastening arranged back of the same port, such fastening devices, one or both, having the feature of automatic detachability under unusual strain, substantially as set forth.

4. In a two-part pipe-coupling the two halves of which are of like construction, the combination of ported ends to provide a circuitous passage-way for the air, heel and toe fastenings to hold the half-couplings together as against ordinary longitudinal strain, and stop-posts *n* to keep the fastenings from slipping laterally out of engagement, substantially as set forth.

5. In the half-coupling described, the combination of a lateral port-opening, a packing-ring arranged therein, and a skeleton pressure-frame and spring-back of the packing-ring, substantially as set forth.

6. In a pair of couplings the ends of which lap onto each other, and thereby bring their lateral port-openings into line with each other, the compressible packing-rings *a*, in combination with hooks and catches *e e'*, whereby the couplings are rendered automatically detachable under unusual strain, substantially as set forth.

7. As a device for connecting together the two halves of a splice-joint coupling, the hook or hooks *e e'*, curved in the direction of the line of engagement, with the radial line of curvature running in the general direction of the line of strain, substantially as set forth.

8. The hook or hooks *e, e'*, curved in the direction of their line of engagement, in combination with a stop or stops, constructed substantially in the manner and for the purposes set forth.

In testimony whereof I, the said GEORGE WESTINGHOUSE, Jr., have hereunto set my hand.

GEO. WESTINGHOUSE, Jr.

Witnesses:

G. F. WARREN,
*Notary Public*, 17 *Gracechurch street, London.*

JNO. DEAN,
*Notarial Clerk, same place.*